I. Smith
Pipe Joint

Nº 102,443.    Patented Apr. 26, 1870.

Witnesses
Fred Haynes
R. E. Rabeau

Inventor
Isaac Smith

United States Patent Office.

ISAAC SMITH, OF NEW YORK, N. Y.

Letters Patent No. 102,443, dated April 26, 1870.

---

IMPROVEMENT IN CONNECTIONS FOR LEAD-PIPE JOINTS.

---

The Schedule referred to in these Letters Patent and making part of the same.

---

*To all whom it may concern:*

Be it known that I, ISAAC SMITH, of the city, county, and State of New York, have invented a new and useful Improvement in Pipe-Joints, of which the following is a full, clear, and exact description, reference being had to the accompanying drawing forming part of this specification, and in which—

Figure 1:
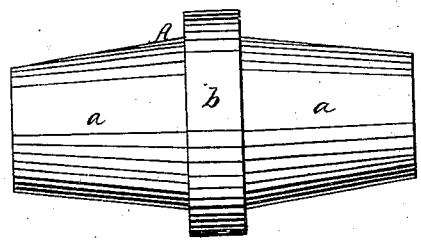
Figure 3:
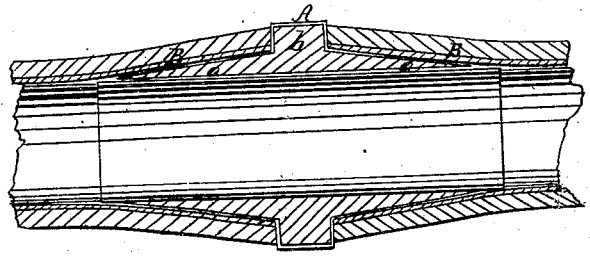
Figure 2:
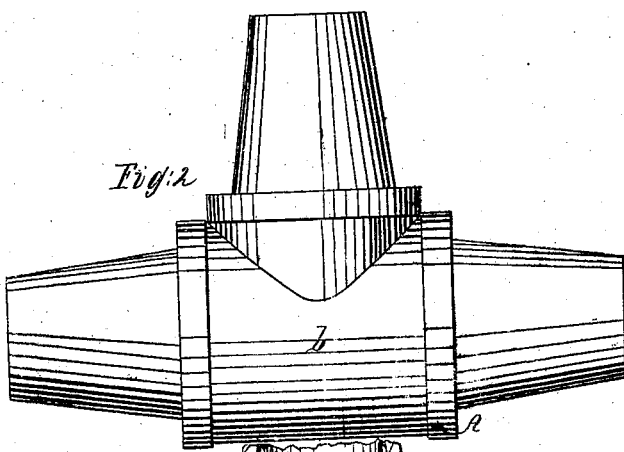
Figure 4:
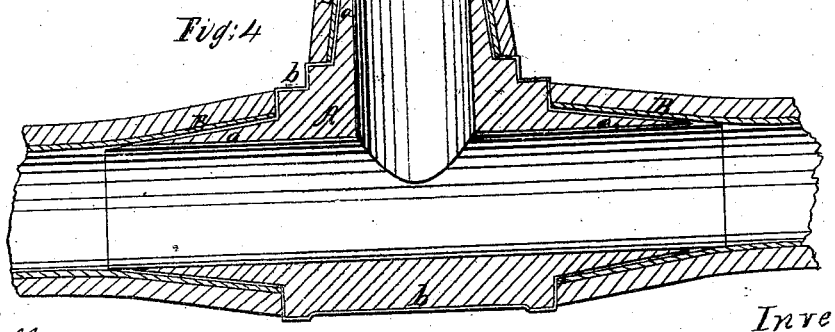

Figure 1 represents a side or longitudinal view of a pipe-connection as used in making a straight or single pipe-joint, in accordance with my improvement;

Figure 2, a similar view of a pipe-connection for establishing a joint of T-form; and Figures 3 and 4, sectional views of the joints as made by said connections and the pipes they serve to unite.

Similar letters of reference indicate corresponding parts.

This invention is designed to be applied to making joints in lead and other soft metal pipes, and will be found specially advantageous in uniting lead-incased tin pipes. Such soft metal pipes are usually joined by what are termed "wipe-joints," which not only have a clumsy, heavy appearance, but, in the case of lead-incased tin pipes, are very imperfect as regards establishing a continuity of the tin, and, moreover, require very skillful workmanship to make.

My invention removes all these objections, and effects a much more perfect and neater joint, which may be made by a workman of comparatively but little skill in such matters. Said invention is based upon soldering the joint on the inside by heat applied to the outside thereof; and to this end, It consists in a thimble-like connection of hard metal, made with a heat-retaining band or projection, which connection, that is, preferably, of tapering character as regards its thimble-like portion or portions, is dipped in molten tin or solder, and, thus coated, inserted within the end or ends of the soft metal pipes to be joined, or the end or ends of the latter spread and drawn or forced over the thimble or thimbles of the connection, so that, on applying heat to the outside of the joint, the same is effectually closed by being soldered on the inside.

While the invention is applicable to a variety of differently-arranged joints or branch attachments to pipes, including the fastening on of faucets, and to soft metal pipes of various kinds, including plain lead pipes, it will suffice here to show it under two forms of construction only, and as applied to lead-incased tin pipes.

Referring, in the first instance, to figs. 1 and 3 of the accompanying drawing—

A represents a brass or other hard metal pipe-connection of tubular character, and formed of reversely-tapering thimbles *a a*, meeting at their larger ends in a thick band or body portion, *b*. This band performs several functions: thus, it serves or may serve as a hold for pincers or tongs, whereby to dip the connection in molten tin or solder; also, as a shoulder for the ends of the pipe to butt against; but its main use is to retain heat to effect the soldering of the joint on the inside by heat applied to its exterior, and to protect the soft metal pipes from contact with the heating tool. Said connection A being dipped, as described, in molten tin or solder, has its thimbles *a a* entered within the ends of the lead-incased tin pipes B B, which it is required to connect, till the said pipes butt up against the band *b* as a shoulder, the ends of the pipes being previously slightly spread, or being opened or spread by the tapering construction of the thimbles, as said pipes are forcibly fitted over them. Heat, by means of a pair of hot tongs or otherwise, is then applied to the outside of the joint through the band *b*, which serves to retain heat to a sufficient degree, and, by the conducting power of the thimbles *a a*, to insure the soldering of said thimbles with the interior surfaces of the pipes B B.

In figs. 2 and 4 of the drawing, the invention is shown as applied to a T-joint, the hard-metal connection A being formed with three thimbles, *a a a*, and two bands, *b b*, the one of which is of considerable length or width, to provide for a proper hold of the hot tongs to heat up or warm both bands; but the joint of the three pipes, B B B, is established in precisely the same manner as has been described in figs. 1 and 3. This connection, like that shown in figs. 1 and 3, is composed of or embraces, it will be observed, reversed thimbles, with an interposed band or body portion.

Where the joint is what may be termed a single one, as, for instance, in attaching a cock to the end of a pipe, a single thimble-like connection suffices, and in such, as in other joints, any suitable interposed or projecting body portion may be substituted for the heat-retaining band.

What is here claimed, and desired to be secured by Letters Patent, is—

A connecting socket, having two or more tapering ends, *a*, and swell *b* between them, said swell extending beyond the periphery of the pipes to be connected, for the application of heat in the manner set forth.

ISAAC SMITH.

Witnesses:
FRED. HAYNES,
HENRY PALMER.